No. 782,434. Patented February 14, 1905.

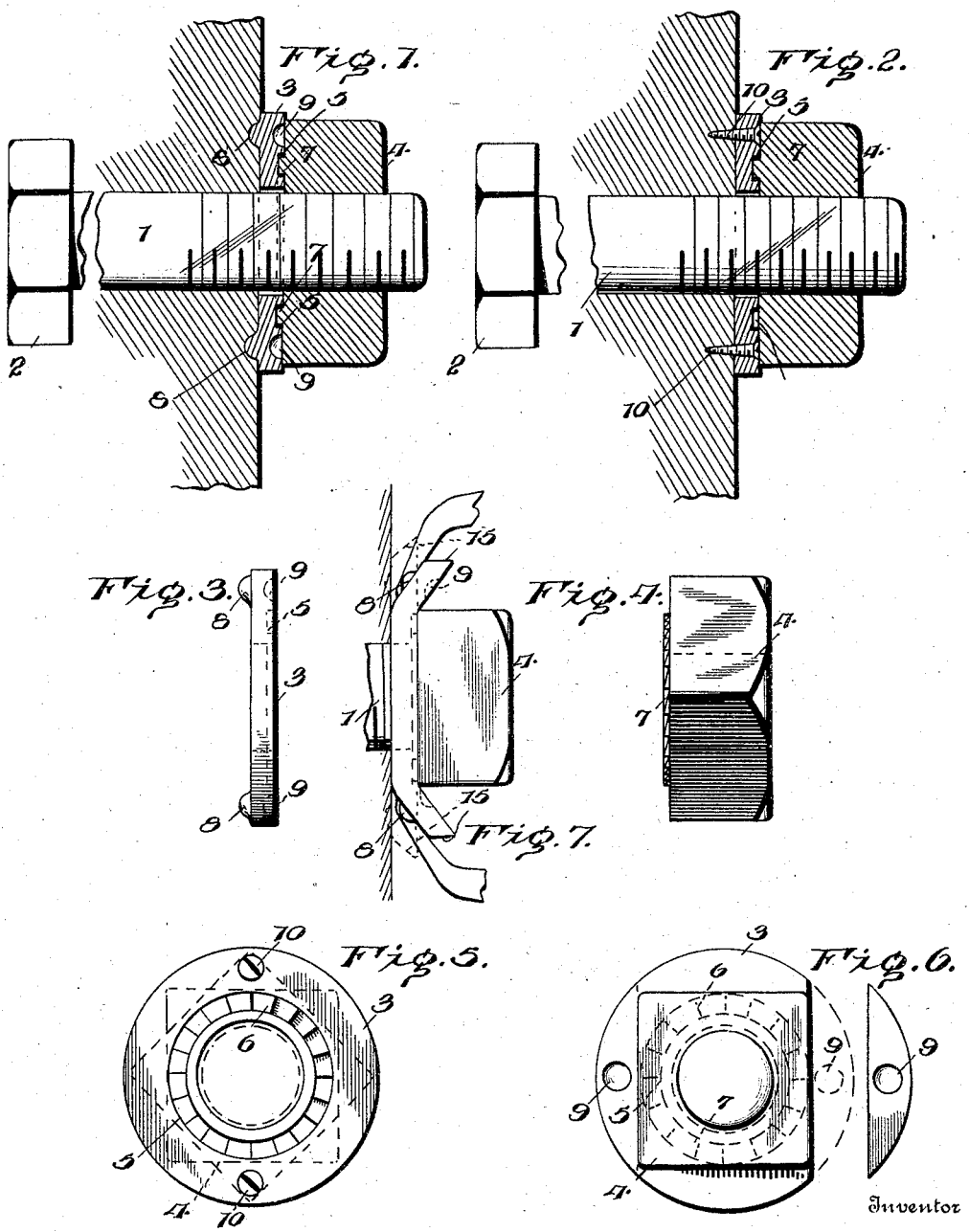

UNITED STATES PATENT OFFICE.

ARTHUR C. BAUMWART, OF CANUTE, OKLAHOMA TERRITORY.

NUT-LOCK.

SPECIFICATION forming part of Letters Patent No. 782,434, dated February 14, 1905.

Application filed June 2, 1904. Serial No. 210,861.

*To all whom it may concern:*

Be it known that I, ARTHUR C. BAUMWART, a citizen of the United States, residing at Canute, in the county of Canute, Territory of Oklahoma, have invented certain new and useful Improvements in Nut-Locks, of which the following is a specification.

This invention relates to improvements in that type of nut-locks involving the use of a lock-washer coöperating with the nut to prevent displacement thereof from the bolt.

Specifically, the invention comprises peculiar interlocking means for establishing an interlocking connection between the washer and the nut and peculiar means for positioning the washer, so that if the nut has been screwed in place the connection between the washer and the nut will effectively obviate any likelihood of accidental unscrewing.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1 is a horizontal section showing one form of lock-washer contemplated in the invention. Fig. 2 is a view similar to Fig. 1, illustrating a different form of lock-washer. Fig. 3 is a plan view of the lock-washer. Fig. 4 is a side elevation of the nut. Fig. 5 is a front elevation showing the construction of the nut-lock involving the use of the washer secured by screws or fastenings. Fig. 6 is a view similar to Fig. 5, the lock-washer showing a different view of positioning means therefor. Fig. 7 is a side view embodying a modification in the form of lock-washer shown in Fig. 1.

Corresponding and like parts are referred to in the following description and indicated in all the views of the drawings by the same reference characters.

Figs. 1 and 2 illustrate the practical adaptation of the invention in securing parts together, and the numeral 1 designates the bolt having the head 2. The lock-washer is designated 3 and the nut 4, the latter being adapted to screw upon the bolt in the usual manner. The lock-washer is provided with a central opening of a diameter larger than the diameter of the bolt, through which the bolt is adapted to pass, and concentric of the opening and upon the outer side of the washer is provided an annular groove 5, which groove is also provided at ascertained intervals in its length with a plurality of teeth 6. The teeth 6 of the washer are adapted to coöperate by interlocking with a plurality of teeth 7, projected from the under side of the nut 4, and the connection between the nut and washer is established by means of the teeth 6 and 7, above described. The nut 4 is provided with the usual threaded opening for attachment to the bolt, and the washer, since it is provided with the enlarged central opening before described, is not designed to come into contact with the bolt whatever. The object in preventing contact of the washer with the bolt is to obviate any likelihood of said washer mutilating the threads of the bolt as the nut is screwed hard thereagainst. The means for preventing contact of the washer 3 with the bolt is provided in the use of the groove 5, within which the teeth 7 of the nut 4 are received when the nut is interlocked with the washer. The groove 5 in receiving the teeth 7 holds the washer 3 so that the bolt is centrally disposed as regards the opening of the washer, the peripheral portions of said openings being thus spaced from the bolt. The washer cannot move laterally, of course, in view of the foregoing construction.

The washer 3 is positioned by means of projecting parts extended therefrom and engaging the parts which are attached by means of the bolt-fastening 1. The projecting parts, in one instance, consist, as shown in Fig. 1, of the lugs 8, formed by depressions 9 in the outer side of the washer, and these lugs 8 are adapted to positively grip into the fish-plate or whatever the part attached and disposed adjacent may be. The lugs 8 are preferably utilized when the parts attached by the bolt are of metal. When the parts attached by means of the bolt 1 are of wood, however, it is preferred to position the washer by means of fastenings in the form of screws 10 or the like, said screws passing through openings in the washer-body and entering the wood of the part against which the washer is forced. To prevent displacement of the fastenings 10, said fastenings are locked by the nut 4, said nut being adapted at certain positions to cover the fastenings 10, as illustrated in dottted lines in Fig. 5. The corner portions of the nut are those portions which are extended over the heads of the fastenings 10 to prevent displacement of the latter, and the teeth 6 and 7 of the nut and lock washer are so arranged and of such a number to admit of a nicety of adjustment of the nut in screwing the same in position, so as to attain the cooperation of the nut with the fastenings 10, as above set forth. To remove the nut when the fastenings 10 are utilized, the said nut must be screwed farther upon the bolt by a slight movement thereof, so that the corner portions which overlap the fastenings 10 will uncover the fastenings, whereupon these fastenings may be readily removed, and the nut, because of its interlocking connection with the washer, may then be unscrewed, the washer rotating in such movement. To remove the nut, when the construction shown in Fig. 1 is utilized, it is only necessary to take a cold-chisel or any suitable implement and cut off those portions of the washer which carry the lugs 8, and after this is done the means for positioning the washer is destroyed, this admitting of unscrewing the nut in a manner which will be clearly seen. One of the portions of the washer 3, which is provided with a lug 8, is shown separated in Fig. 6 of the drawings.

It will be noted that the positioning means for the washer 3 is situated so as to be uncovered by the nut 4, the foregoing construction being advantageous in that said fastening may be removed either by severing a portion of the washer in case of the construction illustrated in Fig. 1 or by uncovering the heads in the fastenings 10 in the construction illustrated in Fig. 2. In other words, the fastening means for the washer is to one side of the nut.

The construction of washer shown in Fig. 7 of the drawings is designed to admit of removal of the nut without necessitating mutilation of the washer by cutting off a portion thereof, as described with reference to Fig. 6. The washer in general form is substantially the same as that shown in Fig. 1, with the exception that opposite edge portions of the washer are beveled toward the under side of this member, as shown most clearly at 15. The beveled construction of the edges of the washer 3 is advantageous in that a suitable implement in the form of pinchers or the like may be forced beneath the beveled portions 15, so as to force these portions upwardly to throw the lugs 8 out of biting engagement with the fish-plate or its equivalent. The beveled portions 15 would of course be provided upon the edges adjacent which the lugs 8 are disposed. The implement is shown in operative position in Fig. 7, being partially broken away.

Having thus described the invention, what is claimed as new is—

In a nut-lock, the combination of a bolt, a lock-washer provided upon its outer side with an annular groove surrounding the opening therein, said opening being of a larger diameter than the diameter of the bolt, means for positioning the washer, teeth situated at intervals in the length of the groove of the washer, a nut, and teeth projected from the under side of the nut and interlocking with the teeth in the groove of the washer.

In testimony whereof I affix my signature in presence of two witnesses.

ARTHUR C. BAUMWART. [L. S.]

Witnesses:
L. KUND,
F. T. SMALLWOOD.